United States Patent [19]

Lofts

[11] 4,260,339
[45] Apr. 7, 1981

[54] TURBO COMPRESSOR
[75] Inventor: Denis L. Lofts, St. Albans, England
[73] Assignee: British Aerospace, Weybridge, England
[21] Appl. No.: 22,179
[22] Filed: Mar. 20, 1979
[30] Foreign Application Priority Data
Mar. 22, 1978 [GB] United Kingdom ............... 11295/78
[51] Int. Cl.³ .............................................. F04B 17/04
[52] U.S. Cl. .................................................. 417/406
[58] Field of Search ............................... 417/406–408; 60/597–614; 308/9, 22, 36.3

[56] References Cited
U.S. PATENT DOCUMENTS
3,692,436  9/1972  Connor et al. ....................... 417/406
3,834,156  9/1974  Cutler et al. ............................ 60/597

FOREIGN PATENT DOCUMENTS
511597   8/1939  United Kingdom .
512223   8/1939  United Kingdom .
731585   6/1955  United Kingdom .
794902   5/1958  United Kingdom .
912135  12/1962  United Kingdom .
1097730  1/1968  United Kingdom .
1132751 11/1968  United Kingdom .
1191110  5/1970  United Kingdom .
1251137 10/1971  United Kingdom .

Primary Examiner—Leonard D. Christian
Attorney, Agent, or Firm—Cushman, Darby & Cushman

[57] ABSTRACT

Turbo compressor apparatus in which the compressor and/or turbine rotor is carried on fluid bearings upon a fixed shaft cantilevered from the rotor housing.

11 Claims, 1 Drawing Figure

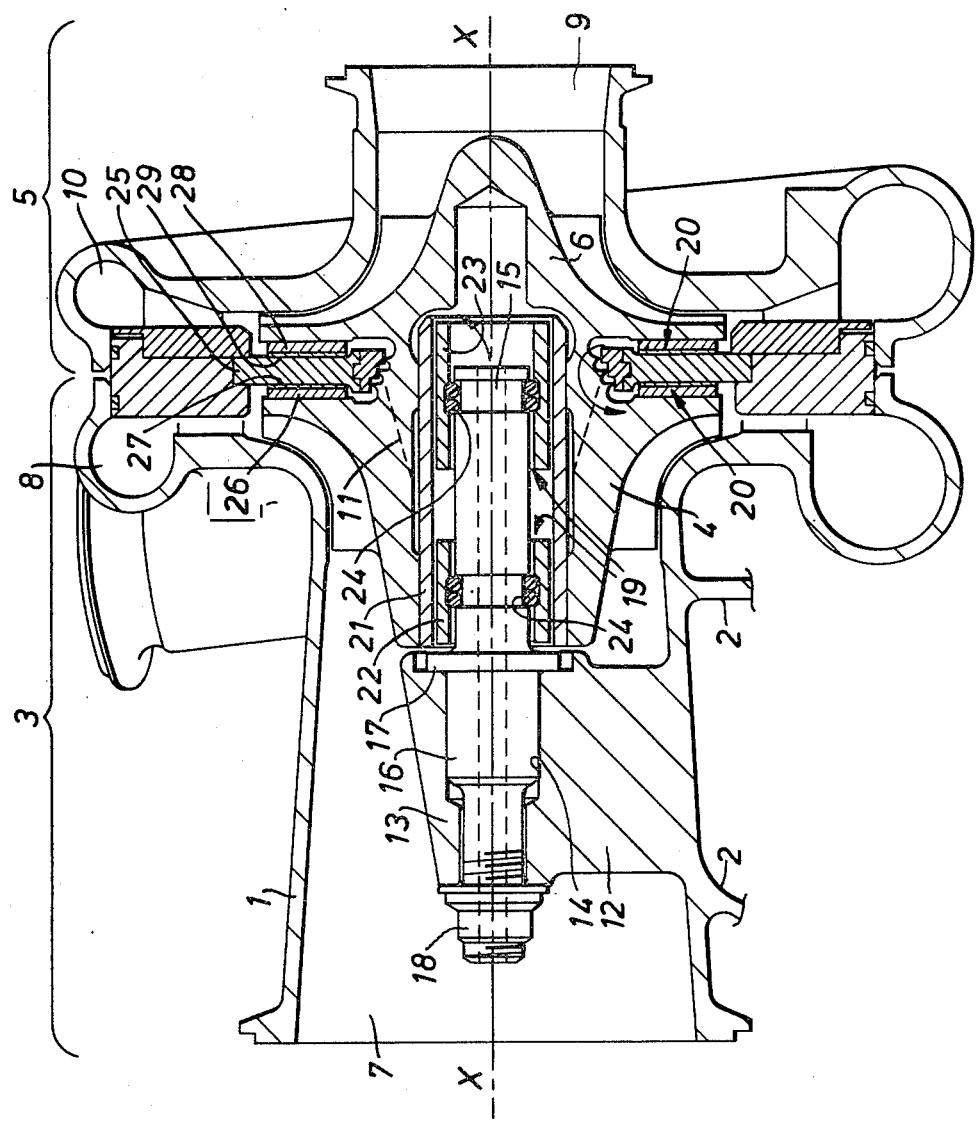

TURBO COMPRESSOR

This invention relates to turbo compressor apparatus.

In general, the rotating parts of turbo compressor apparatus, that is to say the turbine and/or the compressor rotors together with their associated shafting are expensive to produce and also to mount within the apparatus due to their high operational speeds; it is of great advantage if such expense can be reduced so that a wider market is available to the apparatus.

It is an object of the present invention to provide an arrangement for the rotating parts and their mountings which are of relatively low cost.

According to the invention turbo compressor apparatus includes housing means, rotor means housed within the housing means, fixed shaft means, anchorage means fixedly anchoring the shaft means to the housing means, and bearing means axially and radially locating the rotor means for rotation with respect to the shaft means, the bearing means being of the fluid type having at least two opposed surface members between which a working fluid lies during operation.

Preferably the anchorage means anchors only one end of the shaft means to the housing means; the further end of the shaft means remains free.

Conveniently, the bearing means for radial location have one surface member associated with the shaft means and the other associated with the rotor means. In this case resilient mounting means are preferably, but not necessarily, interposed between one of said opposed surface members and its associated shaft or rotor means.

BRIEF DESCRIPTION OF THE DRAWING

A preferred embodiment of turbo compressor apparatus according to the invention is described with reference to the accompanying drawing in which a cross section about a rotational axis X—X of the apparatus is illustrated.

In the drawing, turbo compressor apparatus suitable for the delivery of pressurised cold air to an aircraft cabin includes a housing 1 adapted at 2 for mounting upon a fixed structure not shown. The housing, effectively, is in two parts, one (referenced 3) containing a turbine rotor 4 and the other (referenced 5) containing a compressor rotor 6.

That part of the housing 3 has a turbine exhaust duct 7 and a volute-shaped inlet duct 8; the turbine rotor 4 is of the radial flow type.

That part of the housing 5 has a compressor inlet duct 9 and a volute-shaped outlet duct 10; the compressor rotor 6 is of the centrifugal flow type.

The rotors 4 and 6 are conveniently positioned in back-to-back relationship since they both rotate about the axis X—X. They are formed in one piece, as illustrated, since the operating temperature of both the turbine and the compressor rotors are within the operating limits of a single material. Alternatively if the turbine runs hot, as could be the case in a prime mover, the rotors 4 and 6 can be made of dissimilar materials; in this case they are joined together in a manner to be described. Their joint line is shown diagrammatically at 11 in broken outline.

Irrespective of their construction, the rotors 4 and 6 rotate as a single unit which is mounted within the housing 1 in the following manner. The duct 7 has a radially inwardly extending web 12 with a boss 13 which is formed with a bore 14 lying co-axially with the axis X—X. Fixedly anchored in this bore 14 is a shaft 15 which extends, co-axially with the axis X—X, from its anchored and 16 through that part 3 of the housing into that part 5 of the housing. The shaft is anchored by a shoulder 17 and a nut 18 engaging with a screw threaded region of the shaft end 16 to compress the boss 13 as the nut is tightened. The shaft 15 is, in effect, cantilevered from the boss 13.

The rotor unit 4, 6 is carried for rotation upon the shaft 15 by a bearing arrangement 19 providing radial location and by a further bearing arrangement 20 providing axial location.

The bearing arrangement 19 is of the fluid type, having a cylindrical outer bearing surface member 21 associated with the rotor unit and two axially spaced cylindrical inner bearing surface members 22 and 23 associated with the shaft 15 and lying within the member 21. Exterior faces of the bearing members 22 and 23 lie opposite an interior face of the bearing member 21 and in between is trapped a working fluid providing bearing support. The working fluid can be either a liquid or a gas depending upon engineering choice; in the present instance it is air. Again, it is a matter of engineering choice whether the fluid is self energised by the relative rotation of the bearing surfaces or is supplied under pressure from a pressure source. One of the bearing surface members may be of segmented form rather than truly annular.

Irrespective of the choice of fluid bearing, the inner bearing members 22 and 23 are, in this instance, resiliently mounted upon the shaft 15 by mounting means comprising, for each member, twin elastomeric rings 24 of the 'O' seal type located in annular grooves formed both in an external surface of the shaft 15 and in an interior surface of each member 22 or 23. The outer bearing member 21 is fixedly mounted within the rotor unit; if the rotors 4 and 6 are fabricated separately they are conveniently joined by this member 21.

The bearing arrangement 20, as before mentioned, transmits axial loads to the fixed structure. To transmit these loads directly into the housing 1, instead of through the shaft 15, the housing is provided with reaction means comprising a plurality of radially inwardly projecting reaction members 25 through which the shaft 15 protrudes and to one side of which lies the turbine rotor 4 and to the other side of which lies the compressor rotor 6.

The turbine rotor has an annular disc-like bearing surface member 26, either integrally or separately formed, which is opposed by matching bearing surface members 27 carried by the adjacent sides of the reaction members 25 whilst the compressor rotor 6 has an annular disc-like bearing surface member 28, again either integrally or separately formed, which is opposed by matching bearing surface members 29 carried by the adjacent sides of the reaction members 25. A working fluid transmits any loads between these sets of opposed surfaces; as with the radial bearing arrangement 19, the type of fluid and its energisation is a matter of engineering choice.

The series of reaction members 25 may be arranged to join with one another to form an annular disc which can thus provide a wall between that part of the housing referenced 3 and that part referenced 5.

I claim:

1. Turbo compressor apparatus including housing means, rotor means housed within the housing means, fixed shaft means, anchorage means fixedly anchoring the shaft means to the housing means, and bearing means axially and radially locating the rotor means for rotation with respect to the shaft means, the bearing means being of the fluid type having at least two opposed surface members between which a working fluid lies during operation, said bearing means for radial location having one surface member associated with the shaft means and the other associated with the rotor means, resilient mounting means being interposed between one of said opposed surface members and its associated shaft means.

2. Turbo compressor apparatus including housing means, rotor means housed within the housing means, fixed shaft means, anchorage means fixedly anchoring the shaft means to the housing means, and bearing means axially and radially locating the rotor means for rotation with respect to the shaft means, the bearing means being of the fluid type having at least two opposed surface members between which a working fluid lies during operation, said bearing means for radial location having one surface member associated with the shaft means and the other associated with the rotor means, resilient mounting means being interposed between one of said opposed surface members and its associated rotor means.

3. Turbo compressor apparatus including housing means, rotor means housed within the housing means, fixed shaft means, anchorage means fixedly anchoring the shaft means to the housing means, and bearing means axially and radially locating the rotor means for rotation with respect to the shaft means, the bearing means being of the fluid type having at least two opposed surface members between which a working fluid lies during operation, said apparatus further including reaction means for reacting axial loads and wherein the bearing means for axial location comprise twin bearings of the fluid type each having one surface member associated with the rotor means and the other being associated with the reaction means.

4. Turbo compressor apparatus according to claim 3 wherein the reaction means comprise a plurality of radially inwardly projecting members anchored to the housing means through which the shaft means protrude, and those surface members associated with the reaction means lie on opposite faces of the members.

5. Turbo compressor apparatus according to claim 3 wherein the rotor means includes a centrifugal flow compressor and a radial flow turbine arranged in back-to-back relationship.

6. Turbo compressor apparatus according to claim 5 wherein the reaction means lie between the compressor and the turbine.

7. Turbo compressor apparatus according to claim 5 wherein the turbine and the compressor are formed in one piece.

8. Turbo compressor apparatus according to claim 5 wherein the turbine and the compressor are formed separately and are joined by a sleeve which lies co-axially with the shaft means.

9. Turbo compressor apparatus including housing means, rotor means housed within the housing means, fixed shaft means, anchorage means fixedly anchoring only one end of the shaft means to the housing means, bearing means, radially locating the rotor means for rotation with respect to the shaft means, of the fluid type having two opposed surface members between which a working fluid lies at least during operation, one surface member being associated with the shaft means and the other being associated with the rotor means, said apparatus further comprising resilient mounting means interposed between one surface member and its associated shaft means.

10. Turbo compressor apparatus including housing means, rotor means housed within the housing means, fixed shaft means, anchorage means fixedly anchoring only one end of the shaft means to the housing means, bearing means, radially locating the rotor means for rotation with respect to the shaft means, of the fluid type having two opposed surface members between which a working fluid lies at least during operation, one surface member being associated with the shaft means and the other being associated with the rotor means, said apparatus further comprising resilient mounting means interposed between one surface member and its associated rotor means.

11. Turbo compressor apparatus including housing means, rotor means housed within the housing means, fixed shaft means, anchorage means fixedly anchoring only one end of the shaft means to the housing means, bearing means, radially locating the rotor means for rotation with respect to the shaft means, of the fluid type having two opposed surface members between which a working fluid lies at least during operation, one surface member being associated with the shaft means and the other being associated with the rotor means, said apparatus further including bearing means for axially locating the rotor means with respect to the shaft means, and reaction means anchored with respect to the shaft means, the bearing means for axial location comprising twin bearings of the fluid type each having two opposed surface members between which a working fluid lies at least during operation, one surface member of each twin bearing being associated with the rotor means and the other being associated with the reaction means.

* * * * *